Oct. 12, 1954

J. A. SALDANA 2,691,176

HOME AND TRAVELING KIT

Filed May 15, 1950

J. A. Saldana
INVENTOR

BY Ch Snow & Co.
ATTORNEYS.

Oct. 12, 1954  J. A. SALDANA  2,691,176
HOME AND TRAVELING KIT
Filed May 15, 1950  5 Sheets-Sheet 2
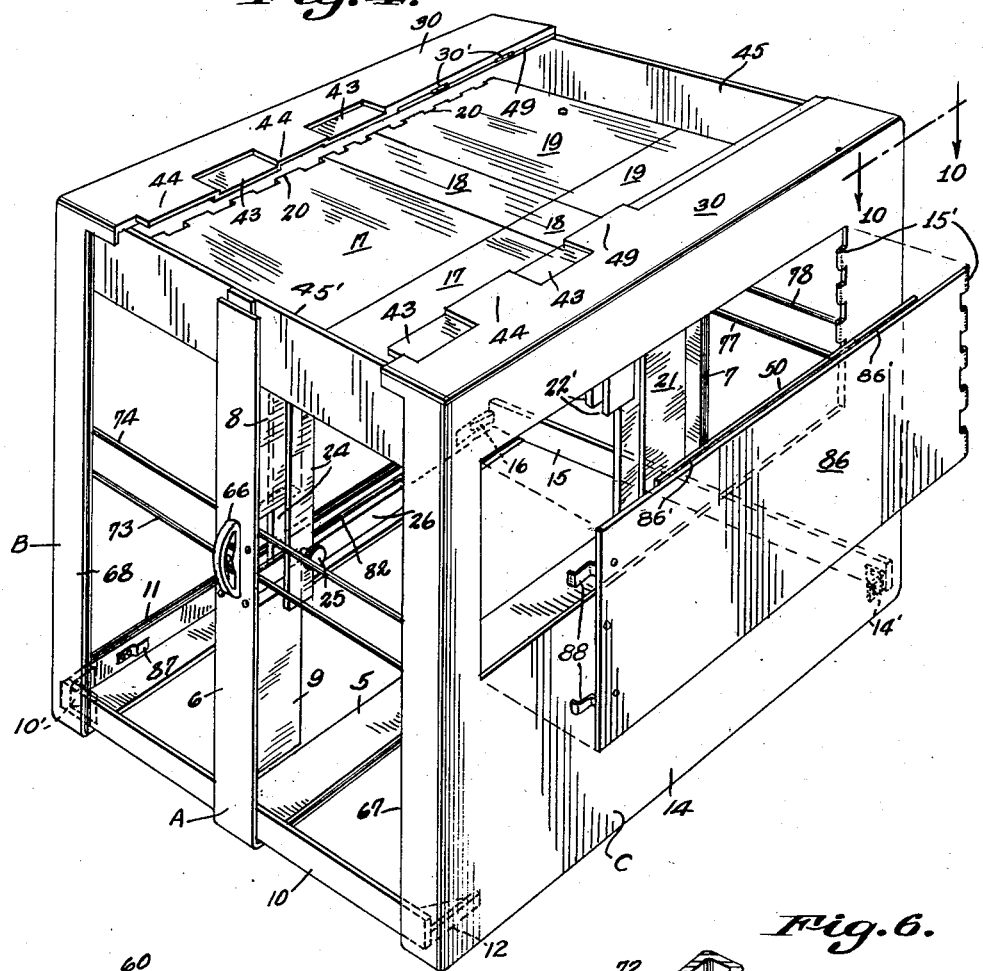
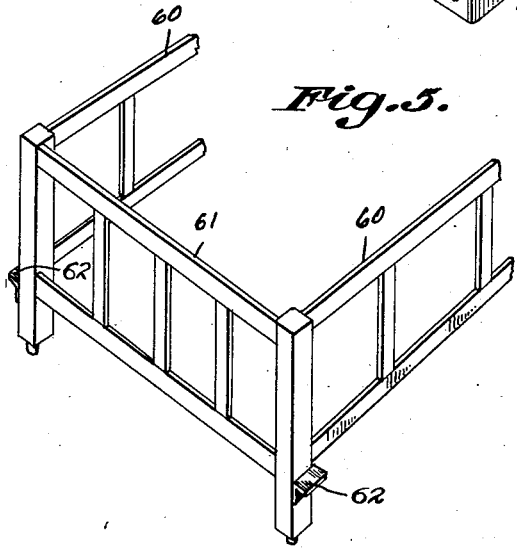
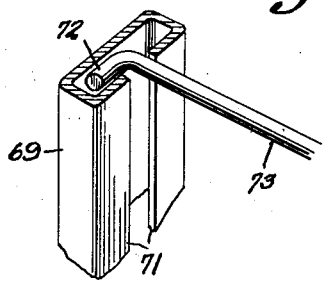
J. A. Saldana
INVENTOR
BY
ATTORNEYS.

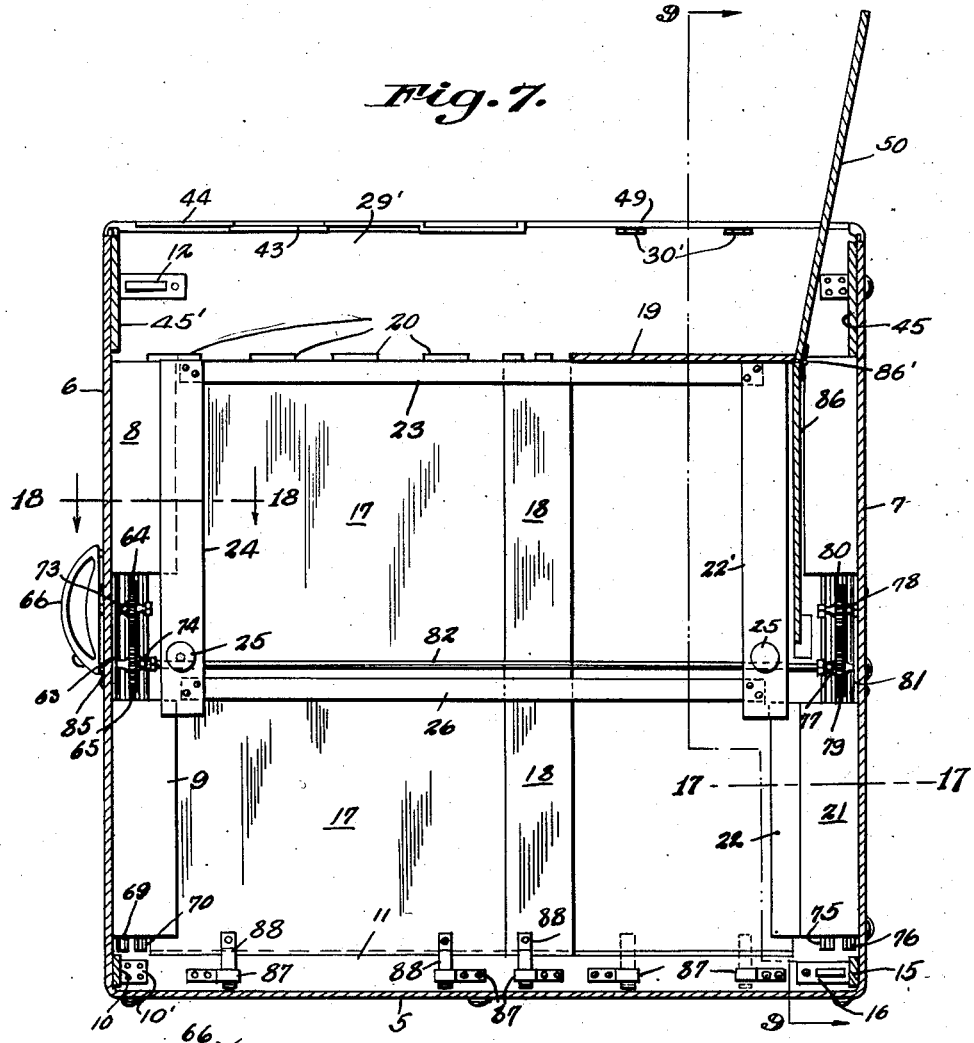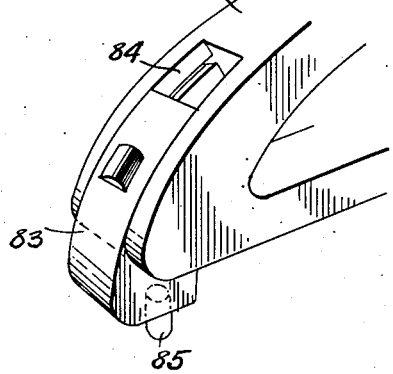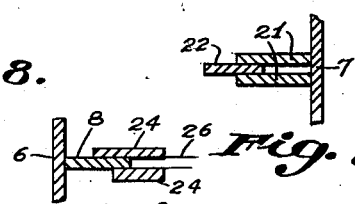

Oct. 12, 1954   J. A. SALDANA   2,691,176
HOME AND TRAVELING KIT
Filed May 15, 1950   5 Sheets-Sheet 4
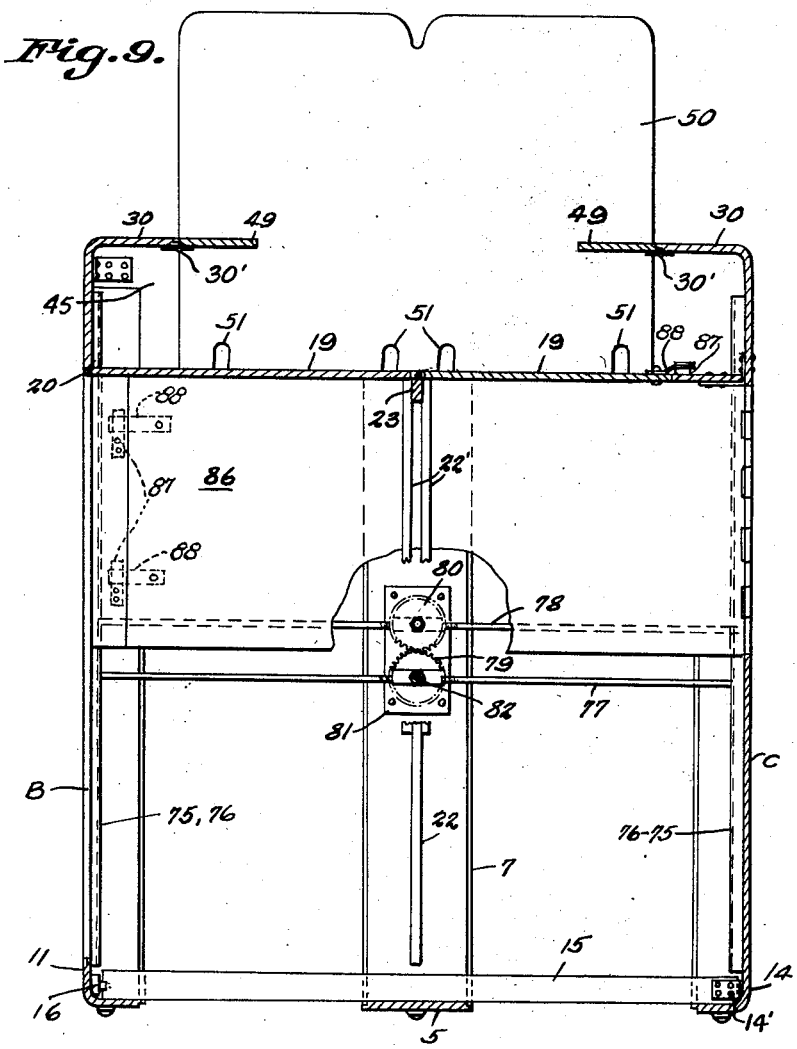
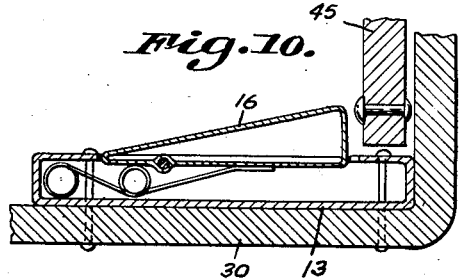
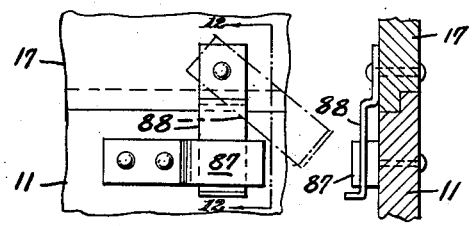
J. A. Saldana
INVENTOR
BY ATTORNEYS.

Oct. 12, 1954    J. A. SALDANA    2,691,176
HOME AND TRAVELING KIT
Filed May 15, 1950    5 Sheets-Sheet 5
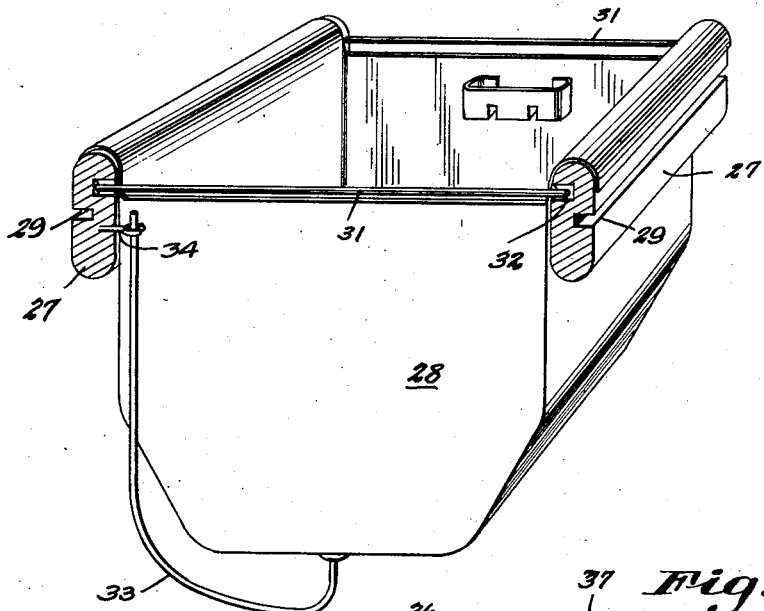
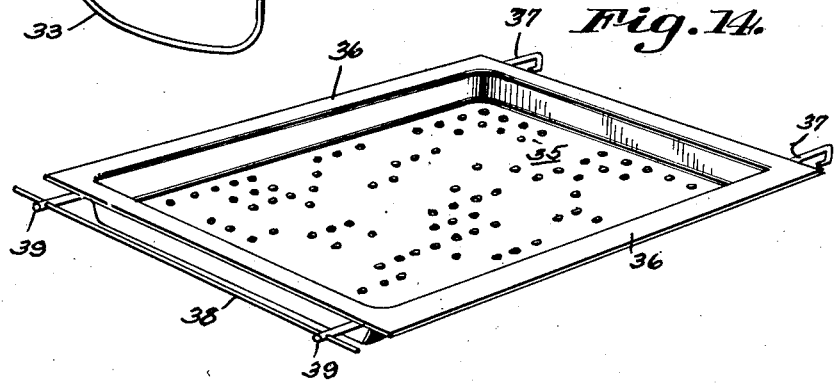
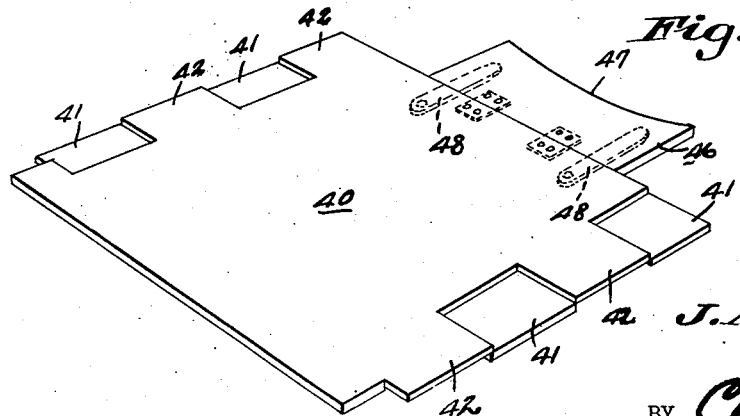
J. A. Saldana
INVENTOR
BY
ATTORNEYS.

Patented Oct. 12, 1954

2,691,176

UNITED STATES PATENT OFFICE 2,691,176

HOME AND TRAVELING KIT

Juan Angel Saldana, Laredo, Tex.

Application May 15, 1950, Serial No. 162,113

7 Claims. (Cl. 5—93)

This invention relates to a kit designed for home or travel use, the primary object of the invention being to provide a kit or case, in the form of a frame which may be collapsed or folded into a small and compact article simulating a suitcase, for convenience in transportation, the device being so constructed and arranged that when it is opened, it may be conveniently and effectively used as a support for a play pen, bassinet, baby chair, etc.

Another object of the invention is to provide a kit of this character which when closed, will provide a case in which various articles such as a folding play pen, seat, bassinet or the like may be contained, so that when the device is opened, it may be readily converted for use as desired. Still another object of the invention is to provide a case of this character embodying hingedly connected sections, which when extended will securely brace the device, and hold it in its extended position providing a substantial support for the play pen, bassinet, or various articles used with the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 4 is a perspective view of the case as extended providing a support for the various articles to be used therewith.

Fig. 5 is a fragmental perspective view of one end of the play pen which is supported by the case when in its extended position.

Fig. 6 is a perspective view partly in section illustrating the channel bars and connecting rods associated therewith.

Fig. 7 is a vertical sectional view through the case as extended providing a seat.

Fig. 8 is an enlarged fragmental detail view illustrating one end of the handle with its locking feature.

Fig. 9 is a transverse sectional view taken on line 9—9 of Fig. 7.

Fig. 10 is an enlarged sectional view illustrating the latching means for holding the pivoted sections of the case in their extended positions.

Fig. 11 is an enlarged detail view illustrating the manner of securing the lower ends of the side panels to the lower bars of the frame.

Fig. 12 is a sectional view taken on line 12—12 of Fig. 11.

Fig. 13 is a perspective view of the bath tub attachment.

Fig. 14 is a perspective view of a wiping tray used in connection with the bath tub.

Fig. 15 is a perspective view of a feeding or play board used with the device.

Fig. 17 is a sectional view taken on line 17—17 of Fig. 7.

Fig. 18 is a sectional view taken on line 18—18 of Fig. 7.

Figure 1:
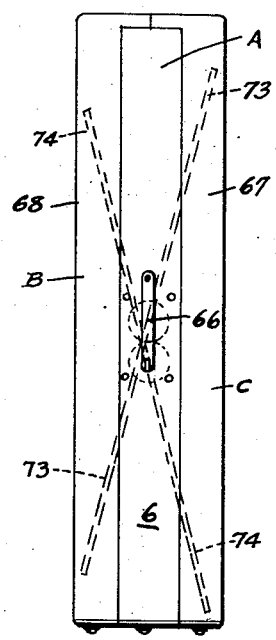
Figure 1 is an end elevational view of a kit or case, constructed in accordance with the invention, illustrating the kit or case as collapsed for transportation.
Figure 2:
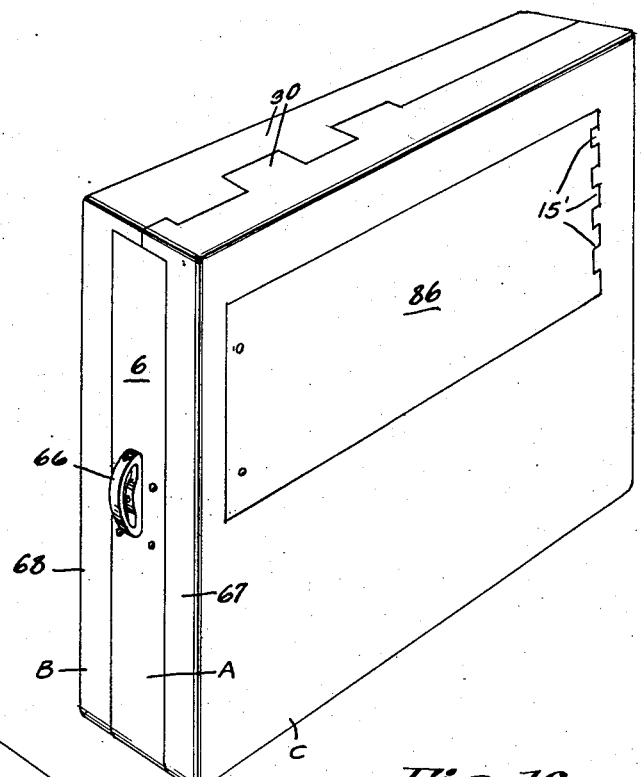
Fig. 2 is a perspective view of the case in its folded condition.

Referring to the drawings in detail, the case embodies a collapsible frame embodying a central substantially U-shaped frame section A including the lower horizontal bar 5 and upstanding front and rear ends 6 and 7, respectively, the front end 6 providing a support for the vertical bars 8 and 9 which have one of their respective edges secured to the inner surface of the end 6, the adjacent ends of the vertical bars 8 and 9 being spaced apart, as clearly shown by Fig. 4 of the drawing. The lower end of the bar 9 is spaced a substantial distance from the lower bar 5 of the central section of the frame, providing a clearance.

The collapsible frame also provides laterally movable side sections B and C, which sections have their marginal edges turned inwardly providing flanges to be hereinafter more fully described. Hingedly connected to the section B, by hinge 10' is the end bar 10 which is adapted to swing outwardly from the section B to the position shown by Fig. 10, where the free end thereof is held against the inner surface of the front marginal flange 68 of the frame section C. At the rear end of the frame section C, is a similar swinging bar 15 which is hingedly connected within the frame section C by means of the hinge 14', the bar 15 being designed to swing outwardly into contact with the opposite frame section B, where it is held by means of the latch member 16. Thus it will be seen that when the side sections of the frame are moved outwardly from the central section, and the bars 10 and 15, are swung outwardly to the positions shown by Fig. 4, the side sections of the frame will be held against inward movement.

As clearly shown by the drawings, the various bars of which the frame is constructed, are of the angle bar type so that the flanges of the bars of the frame, provide supports for cooperating movable arms or bars.

Figure 3:
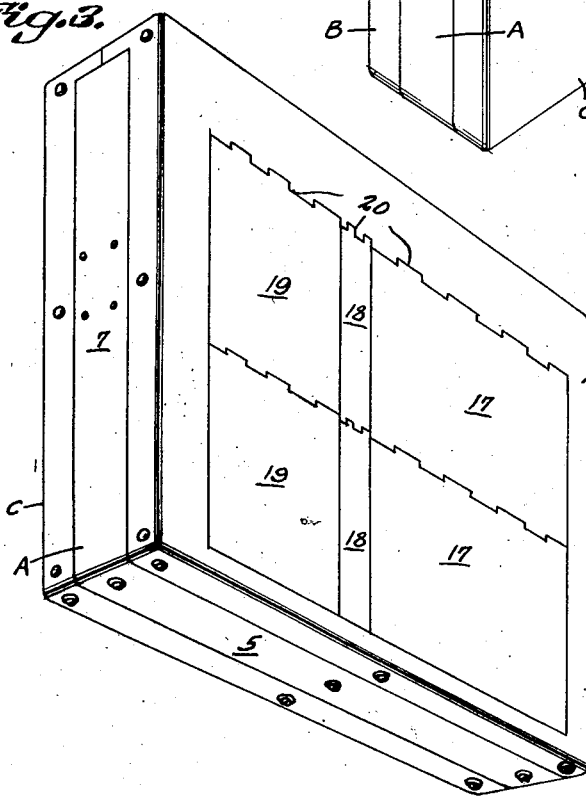
Fig. 3 is a perspective view of the folded case illustrating the bottom and opposite end of the case.

Hingedly connected to the lower edge of the upper bar 29' at one side of the frame, are side boards 17, 18 and 19 which normally close one side of the frame, the boards 17, 18 and 19 being arranged in pairs as shown by Fig. 3 so that they may swing upwardly on the hinges 20 in providing a support or floor near the top of the device, as shown by Fig. 4, when the device is to be used in supporting a play pen, or waterproof pad, should it be desired to use the support as a bassinet. Secured to the lower side bar 11, are keepers 87 under which the pivoted latch arms 88 move in holding the side boards in position to close one side of the case.

Extending inwardly from and secured to the rear bar or end member 7 are spaced plates 21, between which the vertical bar 22 is secured, the vertical bar 22 providing a guide for the spaced guide bars 22' of the rectangular support which includes the bar 23, bars 22' and bars 24, the guide bars 22' being connected with the horizontal bar 23 at the rear end of the bar 23, while at the front end of the bar 23 are secured spaced bars 24 which are so spaced that they move on opposite sides of the upper and lower bars 8 and 9, providing guides for the rectangular support or frame, permitting the horizontal bar 23 to be moved to its uppermost position, from the dotted line position as shown by Fig. 7 of the drawings, when it is desired to use the horizontal bar 23 as a support for the boards 17, 18 and 19. It will be understood that when the bar 23 has been moved to its uppermost position, set screws 25 which are positioned in threaded openings of the bars 24 and 22' are moved to positions to rest on the rod 82, securing the supporting frame of which the bar 23 forms a part, in its uppermost position.

The lower ends of the bars 24 and bars 22', are connected by the lower bar 26, which has its ends secured between the spaced bars 24 at the front end, and the spaced bars 22' at the rear end.

Of course when it is desired to allow the boards 17, 18 and 19 to swing downwardly into parallel relation with the sides of the case, the set screws 25 are loosened, whereupon the vertically movable frame which includes the bar 23, spaced bars 22 and 24, and bar 26, will be lowered until the lower ends thereof rest on the lower bar section 5. The bar 23 being clear of the boards, will now permit the boards to swing downwardly out of use. At the front of the frame is the bar 45' that swings outwardly, where it is secured to the upper latch 12 to brace the frame, the bar 45' being folded inwardly when the frame is collapsed.

When the floor boards have been swung downwardly, the bath tub indicated more particularly by Fig. 13 of the drawings, may be inserted within the open upper end of the case, should it be desired to use the device as a bath tub.

This bath tub comprises side bars 27 to which the rubber bath tub 28 is secured, the bars 27 being provided with grooves 29 formed in the outer surfaces thereof and disposed longitudinally of the side bars, which grooves accommodate the edges of the upper inwardly extended hinged sections 49 to be hereinafter more fully described disposed at the upper side of the case.

When the side bars 27 have been properly positioned, spacing rods 31 are positioned with their ends disposed within the bores 32 formed on the inner sides of the bars 27, holding the bath tub in its extended position.

The reference character 33 indicates the drain tube which is connected with the bottom of the bath tub there being provided a clip 34 secured to one of the side bars 27, to hold the discharge end of the drain tube 32, above the level of the water in the bath tub, but at the same time providing means whereby the water may be readily drained from the bath tub and directed into a receptacle.

As shown by Fig. 14 of the drawings, the tray 35 which is provided with marginal flanges 36 may be positioned over the open side of the bath tub, when it is desired to provide a shelf on which the baby being washed, may be positioned for drying.

The tray is formed with hooks 37 at one of its ends, which hook over one of the spacing rods 31 securing the tray in position. At the opposite end of the tray, is a supporting rod 38 connected to the tray by the arms 39. This supporting rod will of course rest on the opposite spacing rod 31 providing an adequate support.

This structure also affords means whereby the tray may be readily and easily disconnected from the bath tub.

Fig. 15 of the drawings indicates a feeding or play board, which is indicated by the reference character 40 which is provided with offsets 41 at its ends, providing tongues 42, the tongues 42 being designed to fit into the offsets or recesses 43 of the inwardly extended flanges 30 of the frame, while the tongues 44 of the flanges 30 fit into the recesses of the board 40, securing the board in position. This board 40 is of a length slightly less than the length of the upper section of the frame of the case so that when the board 40 has been positioned, a space is provided between the rear edge of the board, and the rear upper bar 45 of the frame of the case.

Hingedly connected with the rear edge of the board 40, is the breast board 46 which has its free edge curved as at 47 to fit around the body of the baby positioned thereagainst. As shown by Fig. 15, this breast board is free to swing downwardly, but when swung upwardly to its horizontal position, the supporting arms 48 which are pivotally connected to the under side of the board 40, are swung to the dotted line positions shown by Fig. 15, holding the breast board in a horizontal position. The back rest 50 is connected to the section 86 by hinges 86'.

At opposite sides of the upper section of the frame, and hingedly connected to the rear ends of the flanges 30 by the hinges 30', are the sections 49 which are swung upwardly and held in their upper positions by contact with the inclined back seat 50, providing a support on which the play board 40 may be held when the play board is to be used. These members 49 have their rear ends spaced from the rear bar 45 so that the back rest 50 may be positioned between the sections 49 and bar 45. It will be understood that the back rest and section 86 may be folded and removed from the position shown by Fig. 9 of the drawings and placed in the opening at one side of the frame, where the back rest and its support will be out of the way, when it is not desired to use the back rest.

Figure 16:
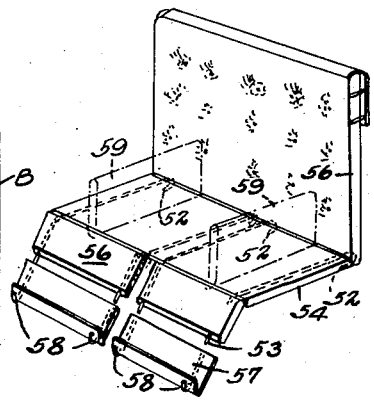
Fig. 16 is a perspective view of a removable padded seat which may fit into the open frame of the device.

Along the lower edge of the back rest 50, are openings 51 that extend upwardly from the lower edge thereof, the openings 51 being provided to accommodate the hooks 52 that are formed at the rear ends of non-flexible wires 53 which extend through bores formed in the seat 54, see Fig. 16, the hooks extending beyond the back 55 of the seat. The hooks 52 pass over the rear edges of the boards 19, holding the seat 54 in position. As shown by Fig. 16 of the drawings, this seat is of a padded construction, and includes the leg members or leg supports 56 and 57, the leg members 57 resting on the hooked ends 58 of non-flexible wires 53.

The upstanding seat members 59 constitute arm rests when the seat is used for a single infant, but when twins are positioned on the seat, these seat sections 59 may be swung downwardly, adding width to the seat.

Fig. 5 shows a pen which may be used as a part of the device, the pen embodying foldable side and end sections 60 and 61, the pen being of rectangular construction, to fit within the upper portion of the device when the floor boards 17, 18 and 19 have been moved to the position as shown by Fig. 4 of the drawings.

Flanges 62 are formed along the outer longitudinal edges of the pen and rest on the inwardly extended flanges 30 of the device. Thus it will be seen that due to this construction, the pen will be held in a secure upright position within the upper portion of the device.

Secured to the inner surface of the front end member 6, at a point substantially intermediate the ends thereof, is the gear plate 63 on which the meshing gears 64 and 65 are mounted in vertical relation with respect to the front end 6 of the frame of the device. A shaft extends forwardly from the gear 64 and passes through the front end member 6, where it is connected with the operating handle 66 so that upon rotation of the handle 66, the gears 64 and 65 will be rotated in opposite directions.

Secured to the inner surfaces of the side members of the device, adjacent to the inwardly extended flanges 67 and 68, disposed at the front of the frame of the device, are spaced channel members 69 and 70 as shown by Figs. 7 and 9 that are disposed vertically, and provided with inwardly extended flanges 71 providing keepers for the right angled ends 72 of the connecting rods 73 and 74 as shown in Figure 6, which rod 73 is welded to the front surface of the gear 64, while the rod 74 is welded to the rear surface of the gear 65.

At the rear of the frame or body portion, and secured to the rear ends of the side members of the frame or body portion, are spaced channel members, see Fig. 9, 75 and 76 which channel members are also provided with inwardly disposed spaced flanges providing keepers for the right angled ends of the rear rods 77 and 78, the rod 77 being welded to the rear surface of the gear 79 while the rod 78 is welded to the gear 80, the gears 79 and 80 being mounted on the supporting plate 81 mounted on the inner surface of the rear end member 7 of the frame. As clearly shown by Fig. 9 of the drawings, these gears 79 and 80 are in constant mesh and rotate in opposite directions, swinging the rods connected therewith in opposite directions, to move the rear ends of the side members of the body portion or frame, towards and away from each other according to the direction of rotation of the gears.

As shown by Fig. 7 of the drawings, a shaft 82 extends longitudinally through the center of the body portion or frame, and connects the gear 65 with the lower gear 79 at the rear of the body portion or frame, so that when the handle 63 is rotated to operate the gears at the front end of the body portion or frame, the gears at the rear end will operate simultaneously and the front and rear ends of the side members of the frame will move evenly and in unison, to insure against binding of the various elements of the body portion or frame, when the handle is rotated.

The handle 66 is provided with a sliding latch 83 which moves in the slot 84 of the handle, the latch being provided with a pin 85 which is movable into an opening of the front end bar 6 of the frame, to lock the handle against movement after it has been operated to either move the body portion or frame to its extended or collapsed position. When the device is in a collapsed position, the handle 66 may be used as a means for carrying the device.

It might be further stated that the side member 14 is formed with a rectangular opening which is normally closed by means of the hinged section 86 which is connected to the member 14 by hinges 15', so that the section 86 may be readily swung to an open position to gain access to the interior of the body portion, should it be desired to do so. This hinged section 86 also provides the support for the back rest 50, which is hingedly connected thereto, and may be removed in its entirety by disengaging the hinges 15'.

From the foregoing it will be seen that due to the construction shown and described, I have provided a folding kit for the care and convenience of infants, which kit may be used in providing a play pen, a child's seat, bath tub, or bassinet, the various articles necessary for converting the device for its various usages, being carried within the folded body portion to the end that the kit may be carried much in the same manner as a suitcase.

Having thus described the invention, what is claimed is:

1. A portable case embodying a central section and side sections, channel members secured to the side sections, providing guides at the front and rear ends thereof, connecting rods having right angled ends fitted in the guides, slidably securing the rods to the guides, means for swinging the rods vertically and moving the side sections to their extended or collapsed positions, pivoted upper and lower front and rear bars forming a part of the frame pivotally connected with one of the side sections adapted to swing outwardly into engagement with the other side section holding said side sections extended, and latches for securing said upper and lower front and rear bars extended.

2. A portable case embodying a central section, side sections, channel members providing guides, secured to the side sections, gears mounted on the central section, connecting rods having right angled ends secured to said gears, the right angled ends of said rods being slidably mounted in said guides holding the sections together whereby said rods move the side sections towards and away from the central section closing or opening the case, and supporting members removably held on the case when the case is extended.

3. In a portable case, a frame embodying a central section and side sections, operating rods pivotally connected with the central section, means for slidably connecting the outer ends of said operating rods to the side sections, whereby said side sections are swung towards and away from the central section as the rods are rotated, hinged boards closing the frame of one of the side sections, said hinged boards adapted to swing upwardly to a horizontal position adjacent to the top of the case providing a floor section, means for securing the boards in their horizontal position, and means for normally securing the boards in their positions closing the side of the portable case.

4. A portable case embodying a central section, side sections, connecting rods pivotally mounted on the central section, the free ends of said rods being slidably connected with the side sections whereby rotary movement of the rods moves the side sections towards or away from the central section to close or open the case, hinged boards forming the side of one of said side sections, said hinged boards adapted to swing to a horizontal position adjacent to the top of the case, providing a floor, and a vertically movable frame supported by the central section adapted to engage the boards in their horizontal positions, supporting the boards, and means for normally securing the vertically movable frame in its supporting position within the case.

5. A portable case embodying a central section and side sections, pairs of connecting rods mounted on the central section at the front and rear thereof, means for slidably connecting said rods to the side sections whereby said side sections are moved towards and away from the central section, as said rods are rotated, a vertically movable rectangular supporting frame mounted within the case at the center thereof, hinged boards forming the side of one of the side sections, adapted to swing upwardly between the side sections providing a floor adjacent to the top of the case, and said vertically movable rectangular frame being movable into engagement with said boards, supporting the boards forming the floor in horizontal positions, and means for securing the vertically movable rectangular frame in its uppermost position.

6. A portable case embodying a central section, side sections, said side sections having inwardly extending horizontal flanges formed at the upper edges thereof, said flanges having spaced offset portions providing tongues, a board having offset portions and tongues disposed along its side edges, fitted between said flanges, the tongues and offset portions of the flanges and board cooperating in securing the board in position at the top of the case, operating rods secured to the central section and having pivotal connection with the side sections whereby said side sections are moved towards and away from the central section to close or open the case, and bars connected with one of said side sections and being movable into engagement with the other side section, holding the side sections spaced apart.

7. A portable case embodying a central section and side sections, said side sections having flanges formed along the upper edges thereof, said flanges extending inwardly, connecting rods arranged in pairs and mounted on the central section, the ends of said connecting rods being pivotally connected with the side sections, means for operating the connecting rods swinging the rods in the arcs of circles, the rods crossing each other moving the side sections towards and away from each other to close or open the case, and said flanges of the side sections cooperating in closing the upper portion of the case.

References Cited in the file of this patent

UNITED STATES PATENTS

| Number | Name | Date |
|---|---|---|
| 4,463 | De Bow | Apr. 18, 1846 |
| 158,670 | Brada | Jan. 12, 1875 |
| 925,314 | Durand | June 15, 1909 |
| 1,510,858 | Nadell et al. | Oct. 7, 1924 |
| 1,551,241 | Dick | Aug. 25, 1925 |
| 2,486,067 | Schroeder | Oct. 25, 1949 |
| 2,514,644 | Irving | July 11, 1950 |

FOREIGN PATENTS

| Number | Country | Date |
|---|---|---|
| 16,585 | Great Britain | 1911 |